United States Patent
Yip et al.

(10) Patent No.: US 12,456,264 B2
(45) Date of Patent: Oct. 28, 2025

(54) METHOD AND APPARATUS FOR PERFORMING ANCHOR BASED RENDERING FOR AUGMENTED REALITY MEDIA OBJECTS

(71) Applicant: Samsung Electronics Co., Ltd., Suwon-si (KR)

(72) Inventors: Eric Yip, Suwon-si (KR); Hyunkoo Yang, Suwon-si (KR); Jaeyeon Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 289 days.

(21) Appl. No.: 18/023,179

(22) PCT Filed: Aug. 26, 2021

(86) PCT No.: PCT/KR2021/011486
§ 371 (c)(1),
(2) Date: Feb. 24, 2023

(87) PCT Pub. No.: WO2022/045815
PCT Pub. Date: Mar. 3, 2022

(65) Prior Publication Data
US 2023/0351705 A1    Nov. 2, 2023

(30) Foreign Application Priority Data
Aug. 27, 2020    (KR) .................. 10-2020-0108790

(51) Int. Cl.
*G06T 19/00*    (2011.01)
*G06T 19/20*    (2011.01)

(52) U.S. Cl.
CPC ............ *G06T 19/006* (2013.01); *G06T 19/20* (2013.01); *G06T 2219/2016* (2013.01)

(58) Field of Classification Search
None
See application file for complete search history.

(56) References Cited

U.S. PATENT DOCUMENTS 11,138,799 B1 * 10/2021 Raghavan ............... G06T 15/50
11,195,214 B1 * 12/2021 Kalaboukis ............ G06Q 40/08
(Continued)

FOREIGN PATENT DOCUMENTS

| KR | 10-2022-0021757 A | 2/2022 |
| WO | 2014/182545 A1 | 11/2014 |

OTHER PUBLICATIONS

Rick Johnson, Dealing with size and scale in Augmented Reality content, XP093105439, Nov. 16, 2017.
(Continued)

*Primary Examiner* — Hilina K Demeter
(74) *Attorney, Agent, or Firm* — Jefferson IP Law, LLP

(57) ABSTRACT

The present disclosure relates to a 5G communication system or a 6G communication system for supporting higher data rates beyond a 4G communication system such as long term evolution (LTE). The present disclosure provides a method and apparatus for anchor based rendering modes, related parameters and metadata. The method for performing rendering for an augmented reality (AR) media object in a communication system is provided, the method comprises obtaining metadata including information for determining a rendering mode of the AR media object, the information including first information indicating whether the AR object include a translational motion, receiving, from a server, AR media data including an AR media object, determining a rendering mode for rendering the AR media object based on the metadata including the first information, and rendering the AR media object based on the determined rendering mode.

18 Claims, 12 Drawing Sheets

(56) References Cited

U.S. PATENT DOCUMENTS

| | | |
|---|---|---|
| 11,710,281 B1* | 7/2023 | Raghavan ............ G06F 16/5854 |
| | | 345/426 |
| 2014/0369557 A1 | 12/2014 | Kayombya et al. |
| 2015/0262029 A1* | 9/2015 | Pirchheim ................. G06T 7/70 |
| | | 382/103 |
| 2016/0240004 A1 | 8/2016 | Ur et al. |
| 2017/0109930 A1* | 4/2017 | Holzer .................... G06T 13/20 |
| 2018/0196261 A1* | 7/2018 | Schickel .............. G06T 19/006 |
| 2019/0080171 A1* | 3/2019 | Zheng .................... G06N 20/00 |
| 2019/0156582 A1* | 5/2019 | Yankovich ........... G06Q 10/087 |
| 2019/0205962 A1* | 7/2019 | Piramuthu .......... G06F 16/9035 |
| 2019/0287306 A1 | 9/2019 | Wieser et al. |
| 2020/0111255 A1 | 4/2020 | Brodsky et al. |
| 2020/0151927 A1* | 5/2020 | Guzman ................. G06V 20/20 |
| 2020/0250852 A1* | 8/2020 | Wei ........................ G01C 19/00 |
| 2020/0326831 A1* | 10/2020 | Marr .................... G06F 3/04883 |
| 2021/0012574 A1* | 1/2021 | Fu ........................... G06F 3/017 |
| 2021/0235058 A1* | 7/2021 | Yip ....................... H04N 13/194 |
| 2021/0264674 A1* | 8/2021 | Shahrokni ............... G06F 3/013 |
| 2022/0053291 A1 | 2/2022 | Yip et al. |

OTHER PUBLICATIONS

Benjamin Nuernberger et al., SnapToReality: Aligning Augmented Reality to the Real World, XP058628352, May 7, 2016, #chi4good, CHI 2016, San Jose, CA, USA.

European Search Report dated Dec. 12, 2023, issued in European Application No. 21862111.8.

* cited by examiner

METHOD AND APPARATUS FOR PERFORMING ANCHOR BASED RENDERING FOR AUGMENTED REALITY MEDIA OBJECTS

CROSS-REFERENCE TO RELATED APPLICATION(S)

This application is a U.S. National Stage application under 35 U.S.C. § 371 of an International application number PCT/KR2021/011486, filed on Aug. 26, 2021, which is based on and claims priority of a Korean patent application number 10-2020-0108790, filed on Aug. 27, 2020, in the Korean Intellectual Property Office, the disclosure of which is incorporated by reference herein in its entirety.

TECHNICAL FIELD

The present disclosure relates generally to a multimedia content processing authoring, a pre-processing, a post-processing, a metadata delivery, a delivery, a decoding and a rendering of mixed reality and augmented reality contents, including 3D media represented by point clouds and meshes.

BACKGROUND ART

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the ¹⁄₁₀ radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via Collison avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

Augmented reality is a form of multimedia experience which enables a user to view a scene consisting of both real and virtual contents, with a seamless AR experience being one where it is almost impossible for a user to distinguish between what is real and what is virtual in the scene (without any sense of touch).

In order to provide an AR experience which is seamless and realistic, not only do the AR contents have to be of high quality, but the rendering placement of the AR contents also have to be extremely accurate. Traditional multimedia in the form of 2D contents do not require any form of interaction, but even for the use case of displaying static AR contents, the rendering complexity to make an AR object appear to be stationary according to the user's movement is significantly higher when compared to the rendering of 2D contents on a conventional display. The use case of rendering and displaying dynamic (moving) AR contents is made even more complex, not only because of the complexity of the capturing stage, but also of the encoding (compression) of the media data, as well as the pre-processing required to prepare a sufficient rendering area for the dynamic AR contents (media objects).

DISCLOSURE OF INVENTION

Technical Problem

In order to augment AR objects onto a surface, or into a space such that it is realistic from the viewer's point of view, the rendering of AR media utilizes anchors. In this disclosure, the term AR media is interchangeable with AR object, AR contents, and 3D media (which can be represented by real captured point clouds, meshes, or can be in the form of graphics or some other representation. Anchors are normally user selected, after plane detection (or similar, through computer vision techniques) such that the AR content can be anchored to a surface, image or similar (e.g. object, image, or face). An anchor provides the basis for the rendering surface/space of an AR object.

Related to the anchoring decision for rendering is the amount of movement that the AR contents (objects) contains, more specifically translational motion. Since an AR object should be rendered realistically such that the viewer cannot differentiate between the virtual object and the real objects in the scene, should an AR object have significant translational motion, there must also be enough free space (or surface area, if rendering on a planar surface) in order for the AR object to move freely across the space or surface.

Another existing problem of AR contents is the large data size required to represent the data. Typically 3D media (objects) are represented by a fixed number of bits per frame (bit depth) such that the objects are represented inside a modelling coordinate system (bounding box) whose size is defined by the number of bits used (this can be either compressed data domain, or uncompressed data domain). A typical example of this is a ply file representing a point cloud object, which may also be compressed using technologies such as MPEG V-PCC at a certain bit depth for the geometry information. For dynamic objects, especially those with translational motion, a large 3D media modelling coordinate system bounding box is required in order for the object to move within the coordinate system as represented by the 3D media modelling system (e.g. ply file) since there is no 3D format currently capable of supporting the representation of temporal point clouds (or 3D media). However, using such a large coordinate system bounding box results in large redundancies, since for each time frame only a partial volume of the bounding box is occupied with actual media data.

The present disclosure provides a method and apparatus for performing anchor based rendering for AR media object efficiently.

The present disclosure provides anchor based rendering modes, related parameters and metadata in order to make an AR object should be rendered realistically such that the viewer cannot differentiate between the virtual object and the real objects in the scene.

Solution to Problem

In an embodiment, a method for performing rendering for an augmented reality (AR) media object in a communication system is provided, the method comprises obtaining metadata including information for determining a rendering mode of the AR media object, the information including first information indicating whether the AR object include a translational motion, receiving, from a server, AR media data including an AR media object, determining a rendering mode for rendering the AR media object based on the metadata including the first information, and rendering the AR media object based on the determined rendering mode.

In another embodiment, an AR device for performing rendering for an AR media object in a communication system is provided, the AR device comprises a transceiver, and a processor configured to obtain metadata including information for determining a rendering mode of the AR media object, the information including first information indicating whether the AR object include a translational motion, receive, via the transceiver from a server, AR media data including an AR media object, determine a rendering mode for rendering the AR media object based on the metadata including the first information, and render the AR media object based on the determined rendering mode.

In yet another embodiment, a server for supporting rendering for an AR media object in a communication system is provided, the server device comprises a transceiver, and a processor configured to receive, via the transceiver from an AR device, a request for metadata associated with rendering of the AR media object, transmit, to the AR device via the transceiver, the metadata including information for determining a rendering mode of the AR media object, the information including first information indicating whether the AR object include a translational motion, and transmit, to the AR device via the transceiver, AR media data including an AR media object.

This disclosure introduces the concept of different anchor based rendering modes. Coded AR media containing implicit translational motion within the modelling coordinate system bounding box can be processed and converted into AR media which do not include translational motion within the modelling coordinate system bounding box (eliminating the redundant bits in coding), where instead the motion is expressed separately explicitly as metadata. The defined anchor based rendering modes enable either translational rendering (implicit or explicit, depending on the AR media properties), or non-translational rendering (induced or natural). These rendering mode decisions are made either through user selection, or through a decision operation flow that takes into account the available rendering area or volume based on a user selected anchor pose.

MODE FOR THE INVENTION

Figure 1:
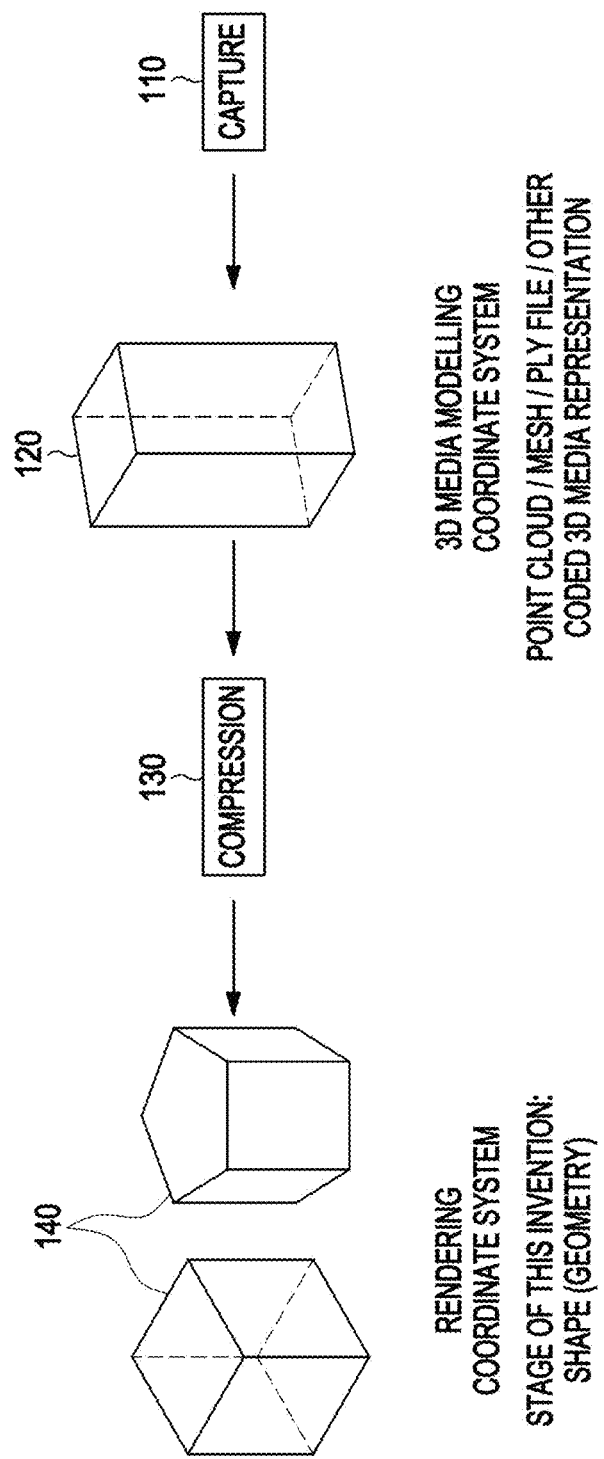
FIG. 1 shows the coordinate systems used in the end to end system to represent 3D media, during each of the different stages.

Hereinafter, embodiments of the present disclosure are detailed described. Examples of the embodiments are shown in the accompanying drawings, wherein the same or similar reference numerals represent the same or similar elements or elements having the same or similar functions throughout. The embodiments described below with reference to the drawings are exemplary and are only used to explain the present disclosure, and cannot be construed as limiting the present disclosure.

Before undertaking the detailed description below, it can be advantageous to set forth definitions of certain words and phrases used throughout this disclosure. The term nying drawings, wherein the samfer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and Cw, it can be advantageous to set forth definitions of certain words and phrases used to and B and C.

Those skilled in the art will understand that, unless specifically stated otherwise, the singular forms ""A, "an" and "the" may include plural forms. It should be further understood that the word "comprise" and "include" used in the specification of the present disclosure refers to the presence of the described features, integers, steps, operations, elements and/or components, but does not exclude the presence or addition of one or more other features, integers, steps, operations, elements, components, and/or combinations thereof. It should be understood that when an element is referred to as being "connected" or "coupled" to another element, it can be directly connected or coupled to the other element, or intermediate elements may also be present. Furthermore, "connected" or "coupled" as used herein may include wirelessly connected or wirelessly coupled. As used herein, the term "and/or" includes all or any of the elements and all combinations of one or more of the associated listed items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

In the present disclosure, by processing AR media contents which contain implicit translational motion into AR media contents which have this motion excluded, coding efficiency is achieved through the elimination of redundant bits.

The translational motion may be a motion of an object up, down, left and right, for example, the translational motion may be a motion to represent whether an object has moved forward or backward.

In the present disclosure, with the decomposition of the motion from the coded unit bounding box and extraction of translational motion as metadata, this metadata can enable various rendering modes as exemplified in the table 1 below:

TABLE 1

|  | Translational rendering | Non-translational rendering |
| --- | --- | --- |
| Translational motion included in modelling box | Implicit: No additional metadata required | Induced: Translational metadata required |
| Translational motion excluded in modelling box | Explicit: Translational metadata required | Natural: No additional metadata required |

In the Table 1, "Translational rendering" and "Non-translational rendering" are classified according to a rendering mode, and "Translational motion included in modelling box" and "Translational motion excluded in modelling box" are classified according to a media property.

Translational rendering is where an AR object (with translational motion during capture) appears to move across the anchored surface such that its translational motion is expressed during rendering (e.g. a person walking along the floor of a room, from left to right, for a distance of 10 metres).

Non-translational rendering is where an AR object (either with or without translational motion during capture) appears to stay on the spot at the specified rendering anchor location surface such that no translational motion is expressed during rendering (e.g. a person with a walking motion appears to stay on the same spot on the floor of a room, as if walking on a treadmill).

Figure 6:
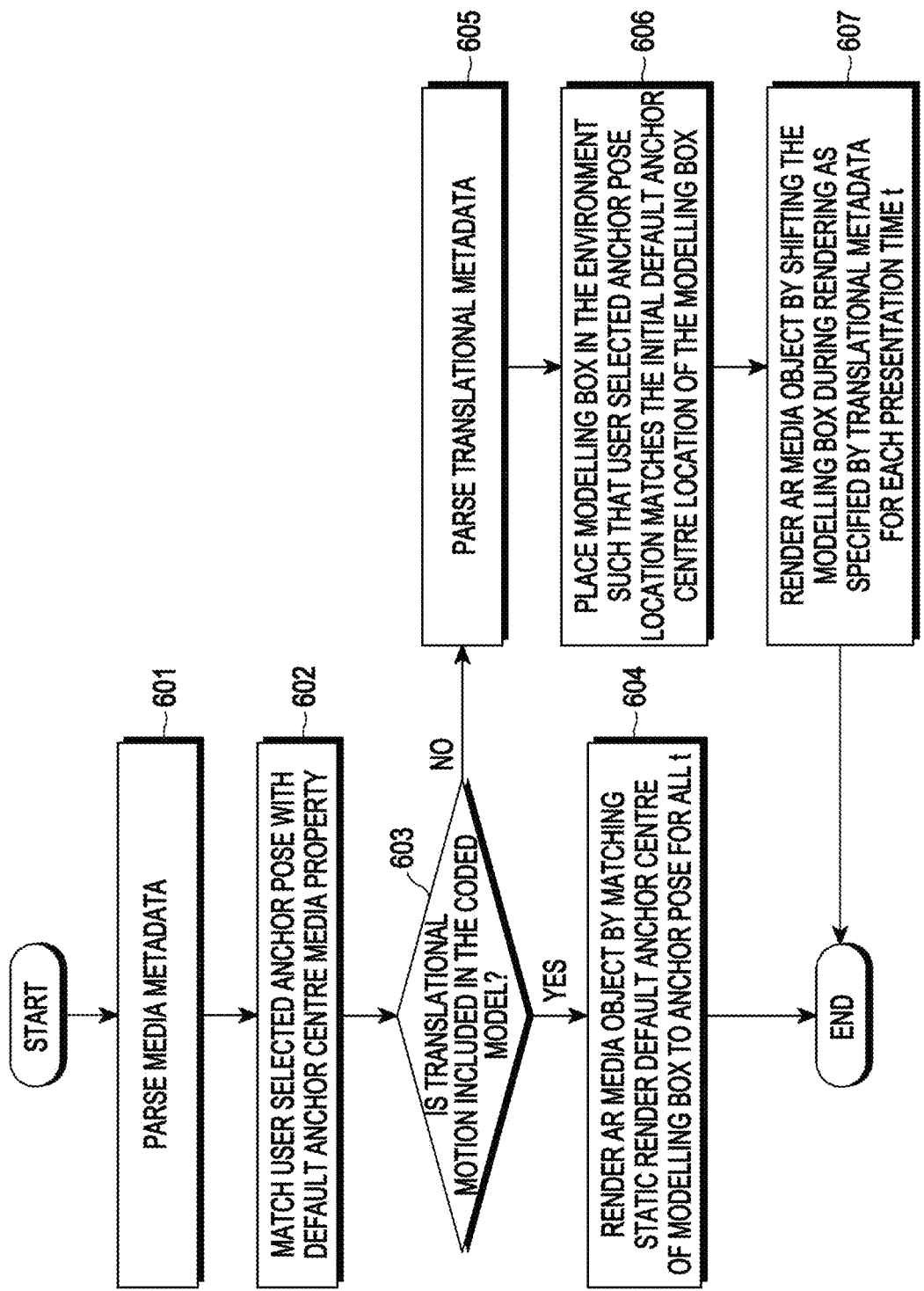
FIG. 6 shows an operation flow of the translational rendering mode performed by an XR/AR device according to an embodiment of the present disclosure.

The decision for rendering mode selection can either be user selectable, or can be through a decision operation flow that takes into account the AR media properties, as well as the available rendering area or volume based on a user selected anchor pose (see FIG. 6).

Rendering Anchor Definition:

In order to place, or augment 3D/AR media objects (contents) correctly for rendering such that the contents exist in the viewer's environment realistically, an AR device must perform spatial recognition of its surrounding environment, including the use of depth information to analyse possible rendering anchor surfaces. Once visual recognition of various anchor surfaces are identified, the device can then render and overlay the content on the viewer's display such that he or she sees the content in a manner such that the content blends into his or her environment naturally/realistically. Typically the selection of where to place the content in the environment is selectable by the user, but to which surface to attach the content to is typically content dependent, through its rendering anchor properties.

Rendering anchors typically provide the following information via parameters or metadata:

The pose of the anchor (location/position and orientation). This is typically user selectable The type of the anchor (anchor surface). This is a property of the surface onto which the AR content is typically augmented. Types include at least one of:

Horizontal plane
Vertical plan
Image
Face
Object

Metadata/Parameters for Anchor Based Rendering Modes (Translational/Non-Translational)

This section gives an example of the syntax and semantics representing the possible parameters to be present in the AR media properties metadata which is referred to throughout this description of this disclosure. The metadata/parameters for anchor based rendering modes may be briefly referred to metadata hereinafter. The metadata may be provided from a network to a UE performing anchor based rendering according to the present disclosure.

Syntax name labels and values are for example only and can be replaceable with other syntax carrying the same or similar semantics for their usage in the operations defined in this disclosure. Syntax is exemplified in Table 2 below:

TABLE 2

```
class ARMediaProperties {
    RenderDefaultAnchorCentre( )
    unsigned int( )       anchor_type;
    unsigned int( )       has_motion_flag;
    unsigned int( )       non_translational_rendering_area;
    if(has_motion_flag=1){
        unsigned int( )   translational_rendering_area;
    }
    unsigned int( )       motion_included_flag;
}
class RenderDefaultAnchorCentre {
    signed int( )         position_x;
    signed int( )         position_y;
    signed int( )         position_z;
    signed int( )         orientation_x;
    signed int( )         orientation_y;
    signed int( )         orientation_z;
    signed int( )         orientation_w;
}
class TimedTranslationalMetadata [for every timeframe t]{
    signed int( )         position_x[t];
    signed int( )         position_y[t];
    signed int( )         position_z[t];
    signed int( )         orientation_x[t];
    signed int( )         orientation_y[t];
    signed int( )         orientation_z[t];
    signed int( )         orientation_w[t];
}
```

Semantics for the Syntax is exemplified in Table 3 and Table 4 below:

anchor_type specifies the rendering anchor type of the anchor, as one of the types listed in the table 3 below:

TABLE 3

| Value | Description |
|---|---|
| 0 | Horizontal plane |
| 1 | Vertical plane |
| 2 | Image |
| 3 | Face |
| 4 | Object |

Figure 2:
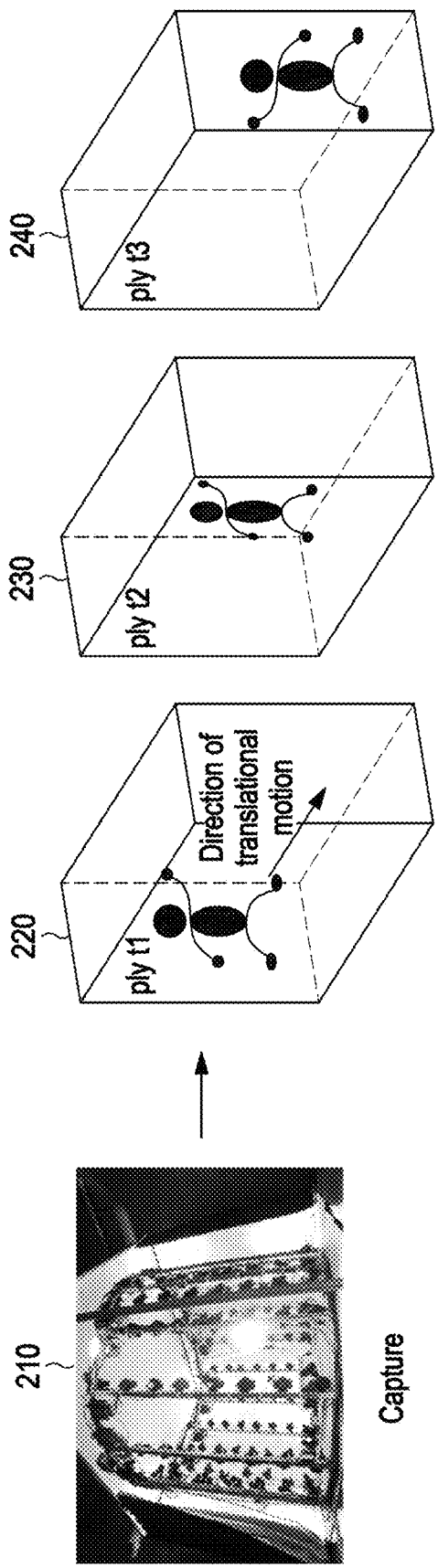
FIG. 2 illustrates an example of a capturing environment containing multiple cameras arranged in a certain configuration enabling for the 3D capture of real objects inside the capture space.
Figure 3:
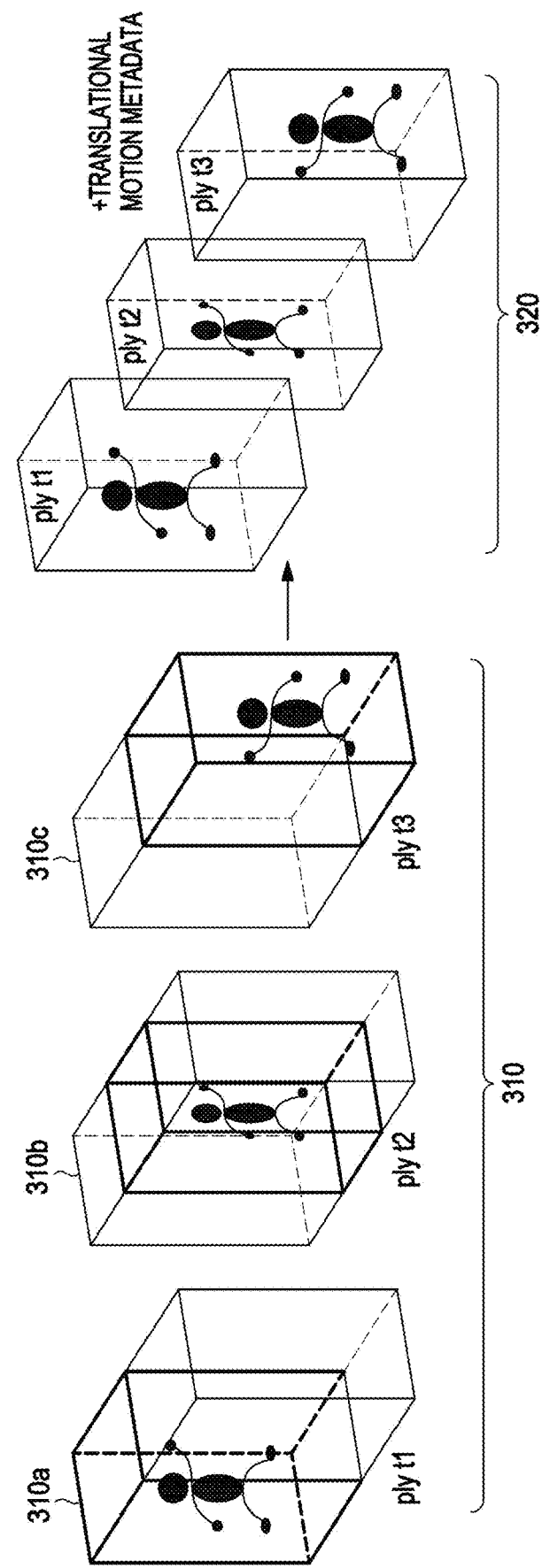
FIG. 3 shows a 3D model pre-processing according to an embodiment of the present disclosure.

TABLE 4 has_motion_flag is a flag indicating, when equal to 1, that the AR media content contains translational motion from the time when it was captured; when equal to 0, indicates that the AR media content does not contain translational motion from the time when it was captured.
non_translational_rendering_area indicates the minimum required surface area, in centimetres squared, for the correct real-scale non-translational (on the spot) rendering of the AR media content. The centre point of this area typically corresponds to the position of the render default anchor centre.
translational_rendering_area indicates the minimum required surface area, in centimetres squared, for the correct real-scale translational rendering of the AR media content. This area provides sufficient space so that AR media content with translational motion can be rendered realistically without error or mismatch (e.g. without a person represented by the AR media content walking into a wall).
motion_included_flag is a flag indicating, when equal to 1, that the coded data model (modelling coordinate system) of the AR media content includes translational motion, as shown in FIG. 2. When equal to 0, the coded data model (modelling coordinate system) of the AR media content does not include translational motion, as shown in FIG. 3. When has_motion_flag is equal to 0, this field shall be equal to 0.
The class RenderDefaultAnchorCentre( ) syntax structure specifies a point and orientation in the modelling box coordinate system of the AR media content, which is used in rendering for correctly augmenting and placing the content (modelling box) onto a pose specified by a (user selected) rendering anchor.
position_x, position_y and position_z specify the x, y, and z coordinates values, respectively, of the pose position coordinate with respect to the 0, 0, 0 origin of the coordinate system used for the 3D modelling (e.g. 0, 0, 0 of a ply file), in units of centimetres.

TABLE 4-continued orientation_x, orientation_y, orientation_z and orientation_w specify the x, y, z and w components, respectively, of an orientation quarternion representing the pose's orientation, with w being the real part of the quarternion, and x, y and z being the imaginary parts.
The class TimedTranslationalMetadata( ) is a syntax structure defining the translational motion of the AR media content over its presentation time. position_x, y, z and orientation_z, y, z, w are specified for every frame at time t, and they indicate the position and orientation, respectively, of the modelling bounding box at the time t, from its initial position and oriention, in units of centimetres.
non_translational_rendering_area and non_translational_rendering_area may also represent volumes in certain cases as described in this disclosure.

FIG. 1 shows the coordinate systems used in the end to end system to represent 3D media, during each of the different stages.

After the capturing stage 110, raw data is processed during the 3D modelling stage 120: at this stage 120, the 3D media modelling coordinate system used is dependent on the media representation format, such as the ply format (polygon file format). An example of a ply file coordinate system would be a 1024×1024×1024 cube represented by 10 bits for each of the x, y, z axis directions. In a stage 130, this ply file is then coded (compressed) using technologies such as MPEG (moving picture experts group) V-PCC (video based point cloud compression), after which it is delivered and decoded to output the original media in the same modelling coordinate system. During the content authoring stage, in a stage 140, the 3D media modelling coordinate system is mapped into a rendering coordinate system which is used for the rendering process, and also optionally the coding (compression) process. The mapping between the 3D modelling coordinate system and the rendering coordinate system is implementation, as well as 3D media format dependent, but an example would be to map a default point in the modelling coordinate system onto another default point in the 3D rendering coordinate system, with this point in the rendering coordinate system able to change with time (essentially translational motion metadata).

FIG. 2 illustrates an example of a capturing environment containing multiple cameras arranged in a certain configuration enabling for the 3D capture of real objects inside the capture space. Furthermore, FIG. 2 shows a dynamic AR media object that has its translational motion coded implicitly into the modelling bounding box of the media data.

Once the real objects are captured (210), 3D modelling is performed to create a photo-realistic representation of the capture object(s), represented as a 3D media object (using point cloud, mesh, or any other data format). Without post-capture processing, the coordinate system used by the media representation format during 3D modelling would match that of the capturing environment. This is shown by the cuboids 220, 230 and 240 in FIG. 2, which remains the same size during the time period t1 to t3, and is big enough such that the translational motion of 3D media object from t1 to t3 can be sufficiently accommodated inside the cuboid. Inside the FIG. 2, the human figure h1 moves from one end of the cuboid to the other end during the time t1 to t3. It should also be noted that the human figure h1 may contain other movements other than the translational motion discussed (such as spinning, or arm raising etc). For each of the ply frames at t1, t2 and t3, it can be noted that only approximately one third (⅓) of the cuboid volume is occupied with media data, resulting in a drop in coding efficiency from a bit depth perspective.

FIG. 3 shows a 3D model pre-processing according to an embodiment of the present disclosure.

In comparison with FIG. 2, FIG. 3 shows the same dynamic AR media object that has its translational motion removed from the modelling bounding box of the media data, the translational motion now decomposed from the bounding box and expressed as translational motion metadata. FIG. 3 refers to the 3D model pre-processing step for changing the captured 3D model in FIG. 2, which contains a translational motion included in the modelling box (coordinate system), into a 3D model which has the translational motion excluded, with the translational motion instead expressed as translational motion metadata.

This decomposition and extraction of the translational motion from the 3D model box (coordinate system) allows for a more efficient coding representation of the 3D media object, as shown by the smaller individual ply model boxes (i.e. boxes marked with a bold line) 310a, 310b and 310c for t1, t2 and t3 as shown in a reference number 310. By using the translational motion metadata during rendering, the 3D media with translational motion excluded achieves the same user viewing (rendering) experience as the original 3D media with the translational motion included in the modelling box as shown in a reference number 320.

Figure 4:
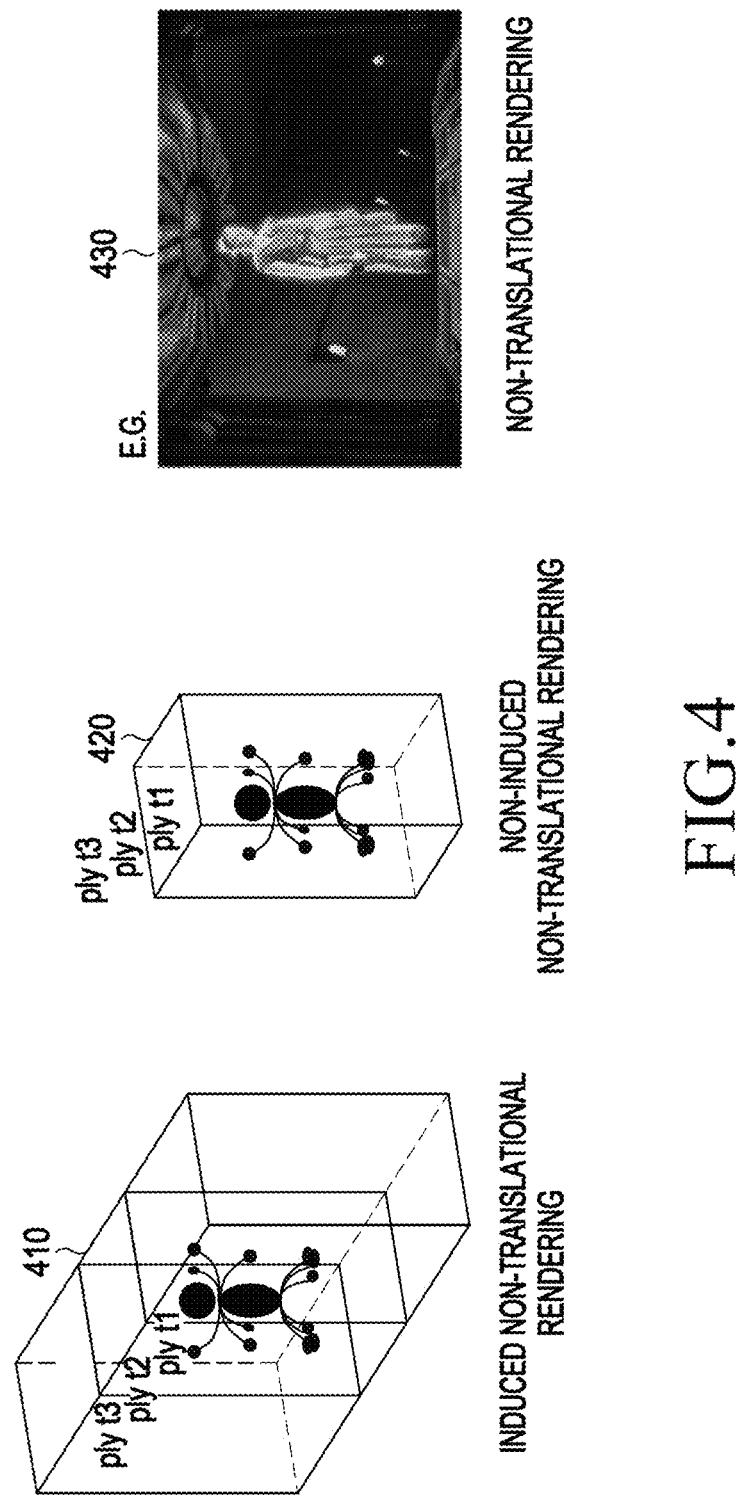
FIG. 4 shows two possible methods to perform non-translational rendering according to an embodiment of the present disclosure.

FIG. 4 shows two possible methods to perform non-translational rendering according to an embodiment of the present disclosure.

The non-translational rendering means that even if the 3D media content has the translational motion, this translational motion is disregarded and instead the 3D media content is rendered as if moving "on the spot".

The two possible methods of non-translational rendering are as follows:
Induced non-translational rendering, where the 3D media content contains a translational motion included in its coded modelling box. For this case, if translational metadata is available, the translational metadata can be used to induce the non-translational rendering by counteracting the translational motion in the 3D media coded content (left picture 410 of FIG. 4).
Non-induced non-translational rendering, where the 3D media content does not contain the translational motion included in its coded modelling box, and is simply rendered (middle picture 420 of FIG. 4).

Both the left and middle pictures 410, 420 of FIG. 4 result in the same user experience (rendered experience), one where the 3D media content appears to stay "on the spot" even if the 3D media content has natural translational motion movements when captured (see right picture 430 of FIG. 4)

In addition, referring to the Table 1, the Table 1 shows the relationship between the possible media properties and rendering modes according to an embodiment of the present disclosure.

If the translational motion is included in the modelling box, translational rendering is implicit, and no additional metadata is required; non-translational rendering is required to be induced, where the included translational motion should be counteracted, this information is supplied through translational metadata, or through some other means (such as artificial intelligence algorithms).

If the translational motion is excluded in the modelling box, translational rendering is achieved explicitly through the use of translational metadata during rendering; non-translational rendering is possible simply by rendering the 3D media content since no translational motion is included in the coded data.

Figure 5A:
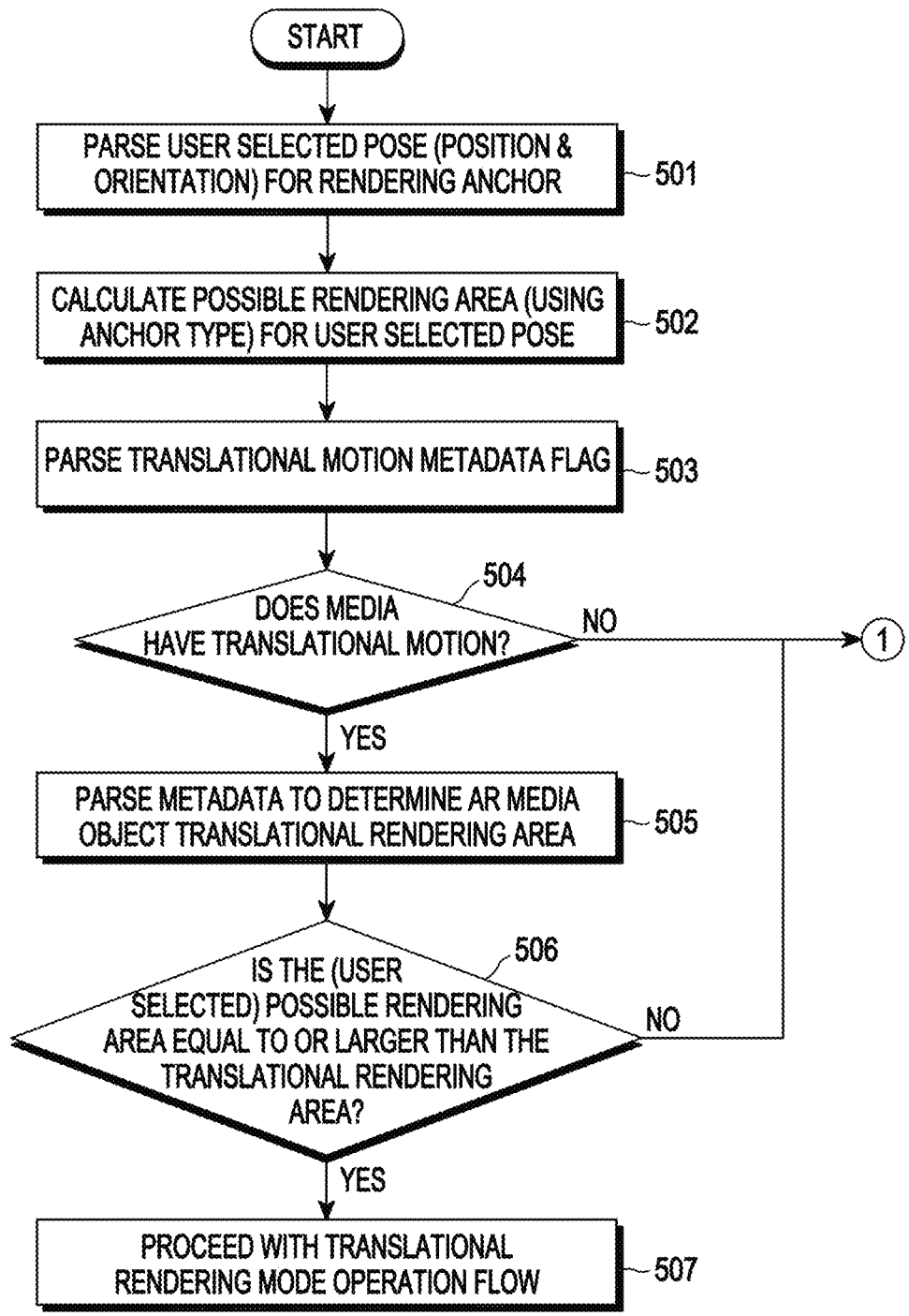
FIGS. 5a and 5b show an operation flow of the translational or non-translational rendering mode decision performed by an XR/AR device according to an embodiment of the present disclosure.
Figure 5B:
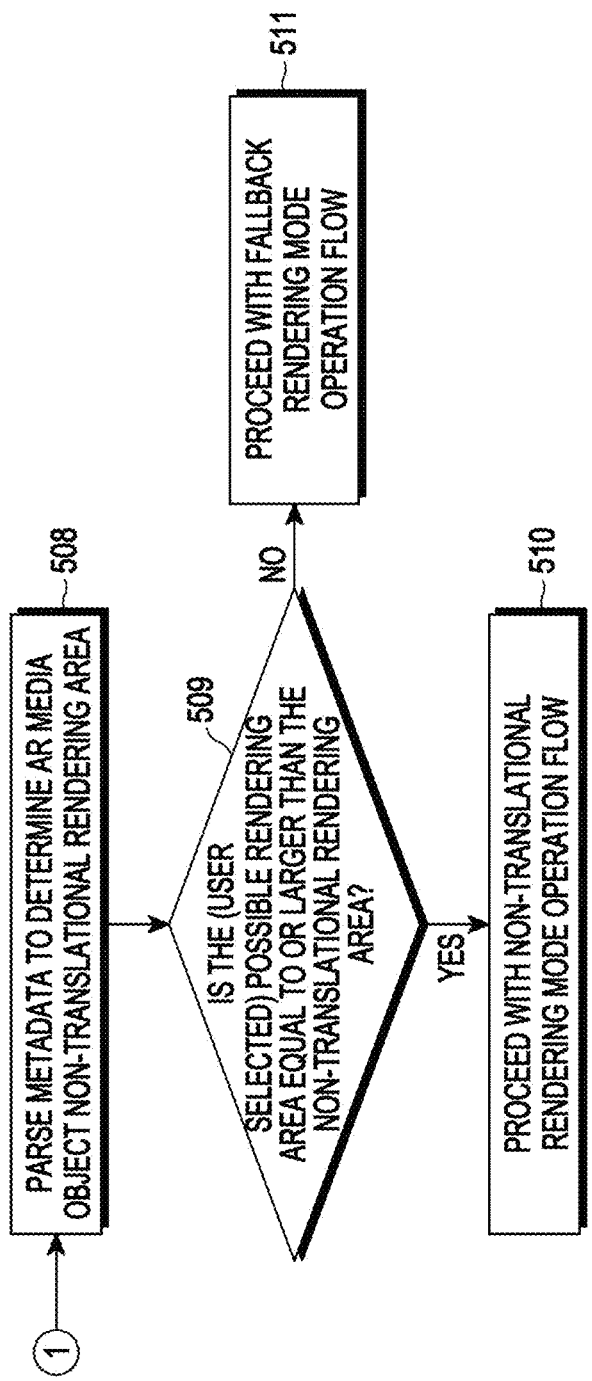

FIGS. 5a and 5b show an operation flow of the translational or non-translational rendering mode decision performed by an XR/AR device according to an embodiment of the present disclosure.

In this operation the user (viewer of the content carrying an XR/AR device) selects the anchor pose for rendering only. Referring to FIG. 5, the operation steps for the rendering mode decision is as follows:

In step 501, The user selects a pose for the rendering anchor (where to place the AR media object in a real environment viewed by the user) That is, the XR/AR device receives a user input for selecting a pose for the rendering anchor. The XR/AR device parses information on the selected pose, which at least one of a position (location) and an orientation of the AR media object. This pose (information) is used for the rendering anchor. [e.g. user may select a point on the floor of his room]

In step 502, through spatial recognition, or any other means, the XR/AR device calculates the actual possible rendering area or volume for the selected pose in the step 501, in the real environment viewed by the user. [e.g. the device calculates the non-occupied surface area around the selected point on the floor in userct room, the amount of floor in -occupied surface area arounduserm, room] This anchor area or volume depends on the rendering anchor type (specified by anchor_type), corresponding to at least one of:

A horizontal surface area for an anchor type of horizontal plane

A vertical surface area for an anchor type of vertical plane

A planar surface area for an anchor type of image (planar orientation is same as the orientation of the image)

A planar surface area or space volume for anchor type of face or object

In step 503, The XR/AR device parses the metadata/parameter (e.g. "has_motion_flag") which indicates that the AR object/media contains a translational motion at the time of content capture (irrelevant of whether the coded data contains this translational motion or not)

In step 504, The XR/AR device determines whether the AR media contains the translational motion from the parsed parameters in the step 503.

In step 505, if the captured AR media contains translational motion, then the XR/AR device parses relevant metadata to determine a translational rendering area of the AR media object (the translational rendering area is specified by "translational_rendering_area" in the Table 2) or volume (the area or volume which is required for the correct translational rendering of the content) age)onal metadata during rendering; non-translational re(anchor) metadata In step 506, the XR/AR device then compares the actual possible rendering area from the step 502 with the translational rendering area of the AR media object from the step 505. If the actual possible rendering area is equal to or larger than the translational rendering area of the AR media object, in step 507, then proceed with the translational rendering mode according to an operation flow in FIG. 6 to be described hereinafter. If the actual possible rendering area is smaller than the translational rendering area of AR media object, then go to step 508.

If the captured AR media does not contains the translational motion in the step 504 or if the actual possible rendering area is smaller than the translational rendering area in the step 506, the XR/AR device, in step 508, parses the relevant metadata to determine the non-translational rendering area of AR media object (the non-translational rendering area is specified by "non_translational_rendering_area" in Table 2) or volume (the area or volume which is required for the correct non-translational rendering of the 3D media content) me (the area or volume which is required f(anchor) metadata of the 3D media content.

In step 509, The XR/AR device then compares the actual possible rendering area from the step 502 with the non-translational rendering area of AR media object from the step 508. If the actual possible rendering area is equal to or larger than the non-translational rendering area of the AR media object, in step 510, then proceed with the non-translational rendering mode according to an operation flow in FIG. 7 to be described hereinafter.

If the actual possible rendering area is smaller than the non-translational rendering area of AR media object in the step 506, in step 511, then proceed with the fallback rendering mode according to operation flow in FIG. 8 to be described hereinafter.

FIG. 6 shows an operation flow of the translational rendering mode performed by an XR/AR device according to an embodiment of the present disclosure.

This operation flow of FIG. 6 can either be triggered by a selection input through the XR/AR device (assuming that the actual possible rendering area is sufficient) or can be triggered as result from the outcome of the rendering mode decision in the step 507 of FIG. 5.

Referring to FIG. 6, the operation steps for the translational rendering (mode) is as follows:

In step 601, the XR/AR device parses the associated media metadata.

In step 602, the XR/AR device matches the selected anchor pose (its location and/or orientation) with the default anchor centre (specified by "class RenderDefaultAnchorCentre" in the Table 2) of the AR media property In step 603, the XR/AR device determines whether the translational motion is included in the coded model of the AR media content through the associated metadata (specified by "motion_included_flag" in the Table 2).

If the translational motion is included in the coded model of the AR media content in step 603, in step 604, the XR/AR device then renders the AR media object by matching the static render default anchor centre (specified by "class RenderDefaultAnchorCentre" in the Table 2) of the modelling box to the same location and/or orientation of the selected anchor pose for all or partial presentation times t (assuming that the render default anchor centre of the content modelling box does not change)

If the translational motion is not included in the coded model of the AR media content in step 603, then the XR/AR device, in step 605, parses the translational metadata (usually timed-metadata, e.g. metadata which indicates the translational motion change as time changes) (specified by "class TimedTranslationalMetadata" in the Table 2)

In step 606, the XR/AR device then places the modelling box in the real environment such that the selected anchor pose matches the initial render default anchor centre location of the modelling box (specified by "class RenderDefaultAnchorCentre" in the Table 2).

In step 607, the AR media object is rendered by shifting the location and/or orientation of the modelling box during rendering, as specified by the translational metadata ("class TimedTranslationalMetadata" in the Table 2) for each presentation time t.

Figure 7:
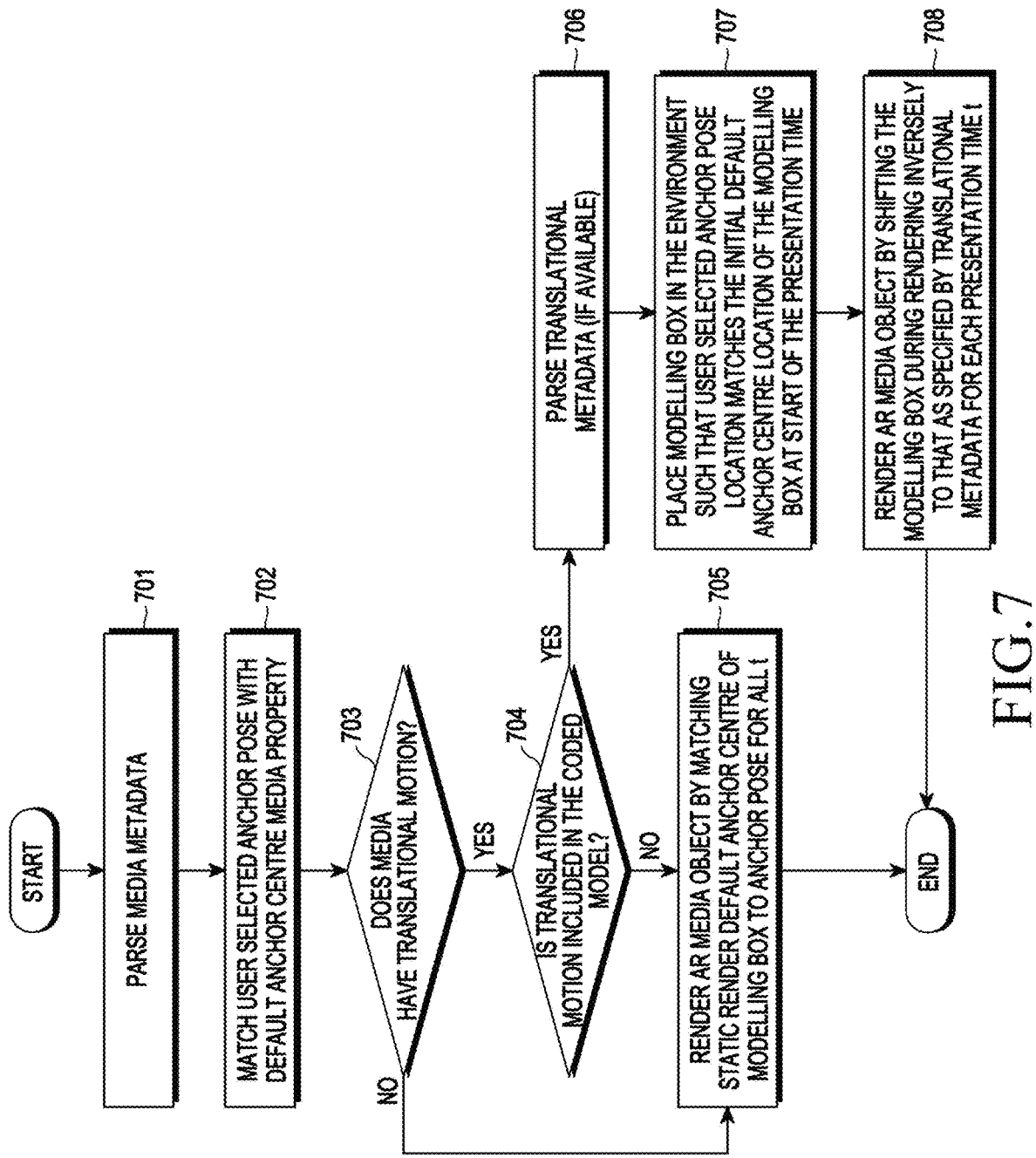
FIG. 7 shows an operation flow of the non-translational rendering mode performed by an XR/AR device according to an embodiment of the present disclosure.

FIG. 7 shows an operation flow of the non-translational rendering mode performed by an XR/AR device according to an embodiment of the present disclosure.

This operation flow of FIG. 7 can either be triggered by a selection input through the XR/AR device (assuming that the actual possible rendering area is sufficient) or can be triggered as result from the outcome of the rendering mode decision in the step 510 of FIG. 5.

Referring to FIG. 7, the operation steps for the non-translational rendering is as follows:

In step 701, the XR/AR device parses the associated media metadata.

In step 702, the XR/AR device matches the selected anchor pose (its location and/or orientation) with the default anchor centre of the AR media property (specified by "class RenderDefaultAnchorCentre" in the Table 2)

In step 703, the XR/AR device determines whether the AR media contains a translational motion from the capturing stage (base on "has_motion_flag" in the Table 2).

If the AR media contains a translational motion from the capturing stage in the step 703, the XR/AR device, in step 704, determines whether the translational motion is included in the coded model of the AR media content (through the associated metadata "motion_included_flag" in the Table 2).

If the translational motion is not included in the coded model of the AR media content in the step 704, the XR/AR device, in step 705, then renders the AR media object by matching the static render default anchor centre (specified by tclass RenderDefaultAnchorCentre" in the Table 2) of the modelling box to the same location and/or orientation of the selected anchor pose for all or partial presentation times t (assuming that the render default anchor centre of the content modelling box does not change)

If the translational motion is included in the coded model of the AR media content in the step 704, then the XR/AR device, in step 706, parses the translational metadata (usually timed-metadata, e.g. metadata which indicates the translational motion change as time changes) (specified by "class TimedTranslationalMetadata" in the Table 2)

In step 707, the XR/AR device then places the modelling box in the real environment such that the selected anchor pose location matches the initial render default anchor centre location (specified by "class RenderDefaultAnchorCentre" in the Table 2) of the modelling box at the start of the presentation time In step 708, the AR media object is rendered by shifting the location and/or orientation of the modelling box during rendering inversely to that as specified by the translational metadata ("class TimedTranslationalMetadata" in the Table 2) for each presentation time t.

Figure 8:
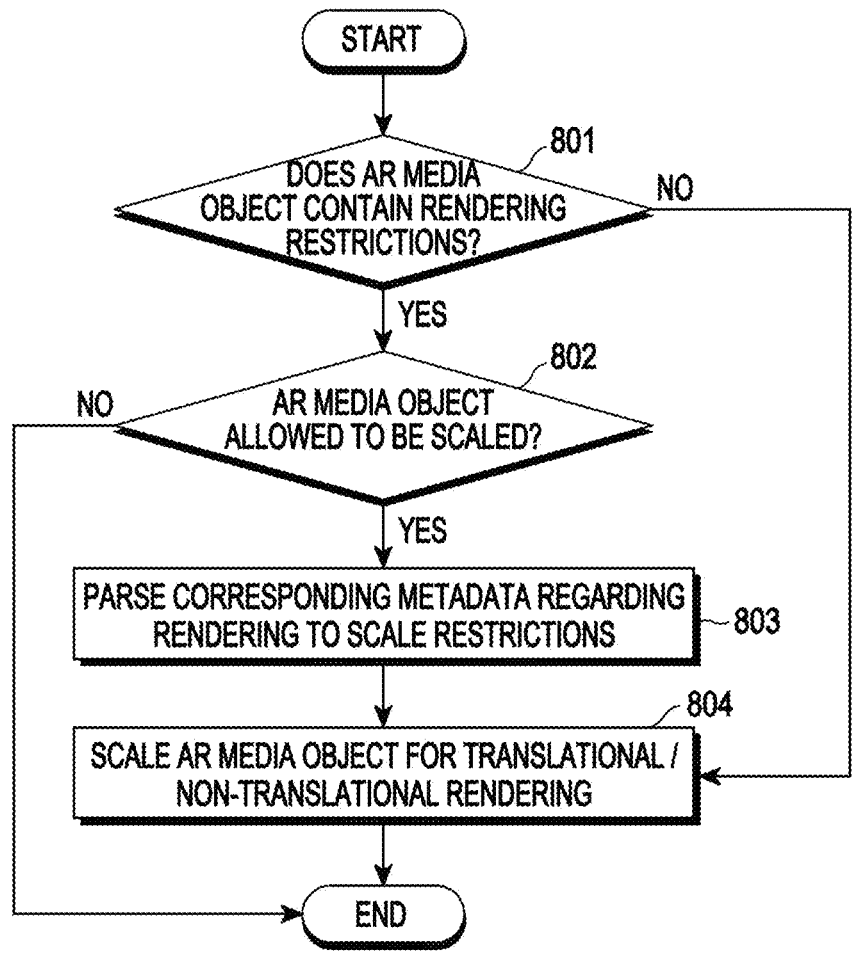
FIG. 8 shows an operation flow of the fallback rendering mode performed by an XR/AR device according to an embodiment of the present disclosure.

FIG. 8 shows an operation flow of the fallback rendering mode performed by an XR/AR device according to an embodiment of the present disclosure.

This operation flow of FIG. 8 can be triggered as result from the outcome of the rendering mode decision in the step 511 of FIG. 5.

Referring to FIG. 8, the operation steps for the fallback rendering is as follows:

In step 801, the XR/AR device determines whether the AR media object contains rendering restrictions.

If the AR media object contains rendering restrictions in the step 801, the XR/AR device, in step 802, determines whether the AR media object is allowed to be scaled for rendering.

If the AR media object is allowed to be scaled for rendering in step 802, the XR/AR device, in step 803, parses the corresponding metadata regarding rendering to scale restrictions (e.g. a list of allowed scaling factors)

If the AR media object does not contain rendering restrictions in the step 801 or after the step 803, the XR/AR device, in step 804, scales the AR media object for either translational or non-translational rendering. In addition, if the AR media object is not allowed to be scaled for rendering in the step 802, the XR/AR device ends the fallback rendering mode.

Figure 9A:
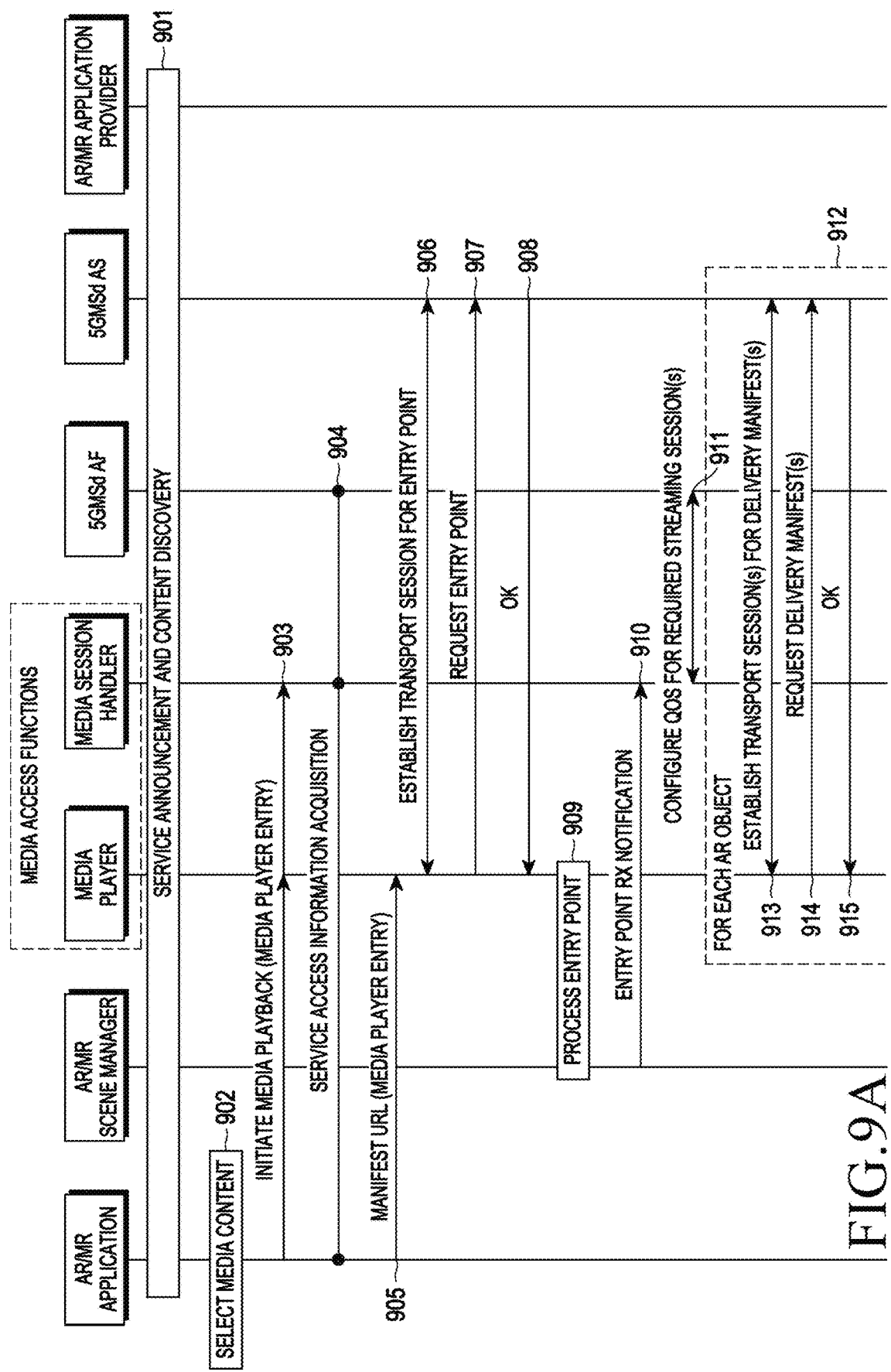
FIGS. 9a and 9b show an operation flow of standalone (STAR)-based media streaming according to an embodiment of the present disclosure.
Figure 9B:
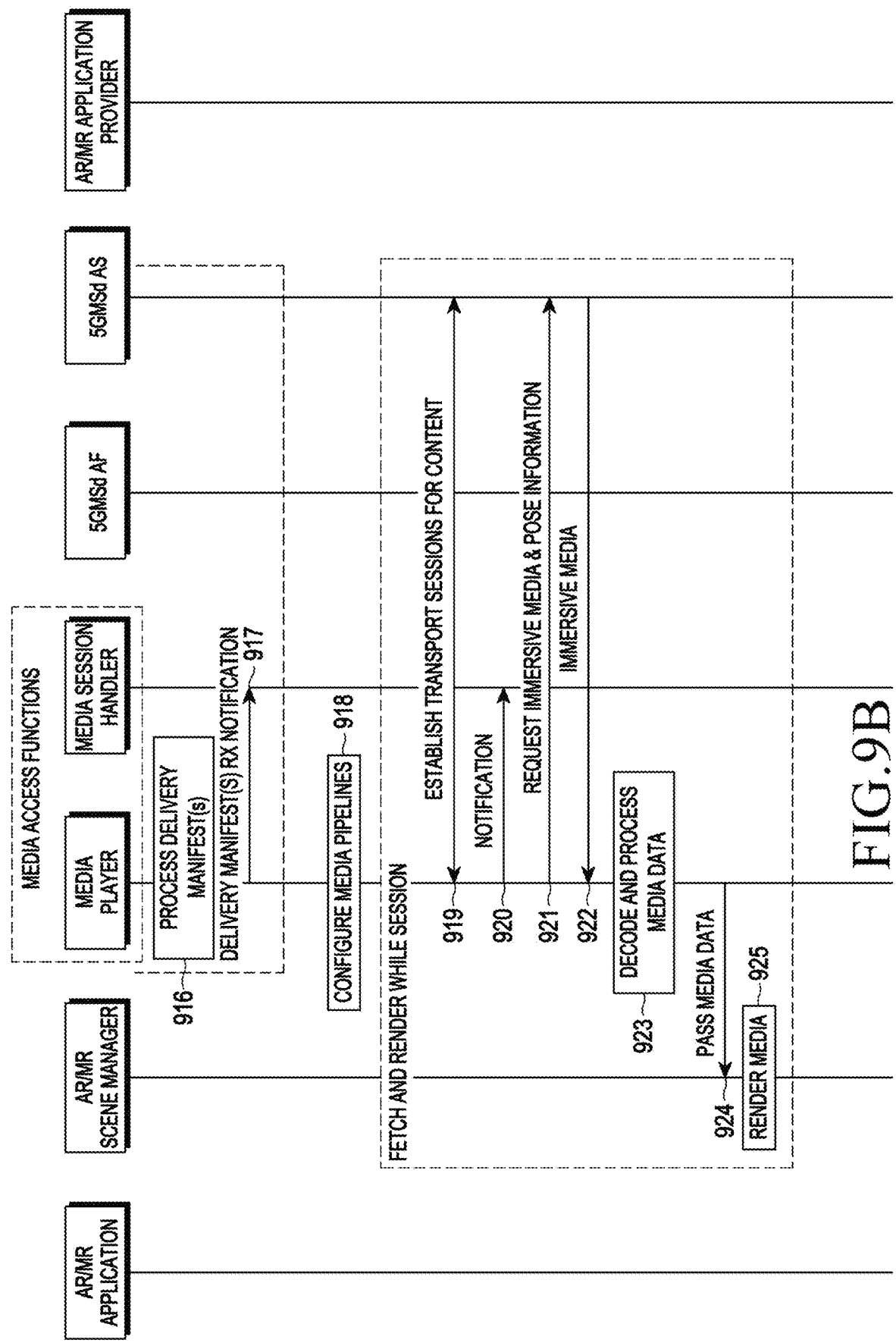

FIGS. 9a and 9b show an operation flow of standalone (STAR)-based media streaming according to an embodiment of the present disclosure. An architecture for the STAR-based media streaming may refer to 3GPP TR 26.998.

Referring to FIGS. 9a and 9b, a UE (or an XR/AR device) may receive, from a network, metadata including information for determining a rendering mode of the AR media object, media data associated with the AR media object, and then render the AR media object based on the determined rendering mode. The UE may include an AR/MR application, an AR/MR scene manager, and media functions. The media functions include a media player and a media session handler.

Specifically, the AR/MR scene manager includes immersive media rendering and scene graph handling functionalities, the media player includes immersive content delivery and immersive media decoding functionalities, and the AR/MR application in the UE may be run by the user input. The UE may initialize AR registration (starts analysing the surroundings where the UE is located), it namely:

a) captures its surroundings via camera(s)
b) analyses where the UE is located
c) registers the UE into the analysed surroundings.

In addition, the network may include a 5G media streaming for downlink (5GMSd) application function (AF), a 5GMSd AS (application server) and an AR/MR application provider. The AR/MR application in the UE and the AR/MR application provider in the network may have exchanged some information, such as device capability or content configuration, for content rendering. It is assumed that the AR/MR application provider has established a provisioning session and its detailed configurations has been exchanged and the AR/MR application provider has completed to set up ingesting immersive contents.

Referring to FIG. 9a, service announcement is triggered by the AR/MR application (step 901). Service access information including media player entry or a reference to the service access information is provided through the network. Desired media content is selected by the UE (step 902). The AR/MR application triggers the media player to start media playback. The media player entry is provided to the media player (step 903). In case that the AR/MR Application has received only a reference to the service access information in the step 901, the media session handler interacts with the 5GMSd AF to acquire the whole service access information (step 904). In parallel, the media player may be invoked to start media access and playback (step 905).

The media player establishes the transport session to acquire entry point information (step 906). The entry point information may or may not correspond to a delivery manifest for streaming AR content, and may be a scene description, dynamic adaptive streaming over HTTP media presentation description (DASH MPD), or a document specific to AR/MR services. The media player requests the entry point to the 5GMSd AS (step 907). The 5GMSd AS provides the entry point to the UE (step 908). The media player and/or AR/MR scene manager processes the entry point to acquire necessary information for accessing AR/MR media content (step 909). In an alternative embodiment, the necessary information for accessing the AR/MR media content may include the metadata exemplified in the Table 2, per media object or stream, inside the entry point (typically a scene description).

The media player and/or the AR/MR scene manager notifies the necessary information acquired from the entry point to the media session handler (step 910). The media session handler shares the information with the 5GMSd AF, in some cases including desired QoS information (step 911). Based on existing provisioning by the AR/MR application provider, the 5GMSd AF may request QoS modifications to the PDU sessions. Media content delivery manifest fetching procedure for each AR object (step 912). For static AR objects, a simple uniform resource locator (URL) may be provided in the entry point information for downloading the AR object media data.

For the required media content, the media player establishes the transport session(s) to acquire delivery manifest(s) information (step 913). The media player requests the delivery manifest(s) (step 914). The 5GMSd AS provides the delivery manifest(s) to the media player (step 915).

Referring to FIG. 9b, the media player processes the delivery manifest(s) (step 916). The media player determines for example the number of needed transport sessions for media acquisition. The media player may use the delivery manifest(s) information to initialize the media pipelines for each media stream. In an alternative embodiment, the delivery manifest(s) information may include the metadata exemplified in the Table 2, per media object or stream. In the present disclosure, the UE may obtain, from the network, the metadata exemplified in the Table 2 according to at least one operation of the step 909 and the step 916. The media player notifies the media session handler about the delivery manifest(s) (step 917). The media player configures the media playback pipelines (step 918). The media player establishes the transport session(s) to acquire the AR/MR media content (step 919). The media player notifies to the media session handler that the playback is ready (step 920).

The media player requests the immersive media data according to the delivery manifest processed, possibly taking into account pose information for further processing (e.g., viewport dependent streaming) (step 921). The media player receives the immersive media data and triggers the media rendering pipeline(s), including the registration of AR content into the real world accordingly (step 922). The media player decodes and processes the media data (step 923). The media player passes the media data to the AR/MR scene manager (step 924). The AR/MR scene manager renders the media, which includes the registration of the XR/AR media content into the real world accordingly (step 925). In the embodiments of FIGS. 3 to 8, the above operations of the UE (or the XR/AR device) determining the rendering mode and performing rendering according to the determined rendering mode may be performed in the step 925.

Figure 10:
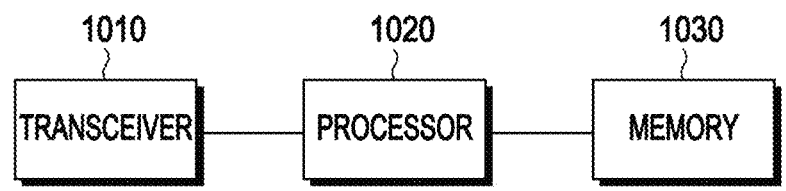
FIG. 10 is a block diagram of an XR/AR device according to an embodiment of the present disclosure.

FIG. 10 is a block diagram of the XR/AR device according to an embodiment of the present disclosure. The XR/AR device may be implemented in the UE or a XR/AR glasses.

Referring to FIG. 10, the XR/AR device may include a transceiver 1010, a processor 1020, and a memory 1030. In the present disclosure, the processor 1020 may include a circuit, an application-specific integrated circuit (ASIC), a controller or at least one processor. The transceiver 1010 may transmit and/or receive signals to and from a server over the network. The processor 1020 may control the overall operation of the XR/AR device according to at least one of the embodiments described in the present disclosure. For example, the processor 1020 may control the operation flow to perform the operations according to one or a combination of embodiments in FIGS. 6 to 9 described above. For example, in one embodiment, the processor 1020 may parse the selected pose, which consists of a position (location) and also an orientation. The processor may parse the metadata/parameter associated with the AR object/media and determine whether the AR media contains translational motion from the parsed parameters. The memory 1030 may store at least one of information exchanged through the transceiver 1010 and information generated by the processor 1020. The XR/AR device may include a display for displaying the AR media data and an input unit for a key/touch input. For example, the anchor pose may be selected by the input unit.

Figure 11:
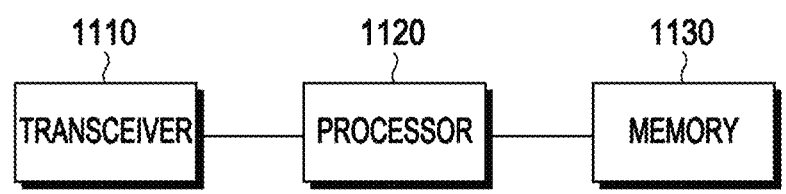
FIG. 11 is a block diagram of a server according to an embodiment of the present disclosure.

FIG. 11 is a block diagram of a server according to an embodiment of the present disclosure. The server may be one of network entities described in an embodiment of FIGS. 9a and 9b. The network entities include the (5GMSd) AF, the (5GMSd) AS and the AR/MR application provider.

Referring to FIG. 11, the server may include a transceiver 1110, a processor 1120, and a memory 1130. In the present disclosure, the processor may include a circuit, an ASIC, a controller or at least one processor. The transceiver 1110 may transmit and/or receive signals to and from the XR/AR device. The processor 1120 may control the overall operation of the server according to at least one of the embodiments described in the present disclosure. For example, the processor 1120 may control the operation flow to perform the operations according to one or a combination of embodiments in FIGS. 6 to 9 described above. For example, the processor 1120 may transmit the metadata/parameter associated with the AR object/media to the XR/AR device through the transceiver 1110. The memory 1130 may store at least one of information exchanged through the transceiver 1110 and information generated by the processor 1120.

While the present disclosure has been particularly shown and described with reference to certain embodiments thereof, it is clearly understood that the same is by way of illustration and example only and is not intended to be taken in conjunction with the present disclosure. It will be understood by those skilled in the art that various changes in form and details may be made therein without departing from the subject matter and scope of the present disclosure as defined by the appended claims and their equivalents.

The invention claimed is:

1. A method for performing rendering for an augmented reality (AR) media object in a communication system, the method comprising:
    obtaining metadata including information for determining a rendering mode of the AR media object, the information including first information indicating whether the AR media object includes a translational motion;
    receiving, from a server, AR media data including the AR media object;
    identifying an anchor pose selected for a rendering anchor of the AR media object;
    identifying a first rendering area possible based on the anchor pose;

identifying a second rendering area required for the AR media object based on the metadata in case that the first information indicates that the AR media object includes the translational motion;

comparing the first rendering area with the second rendering area;

determining the rendering mode for rendering the AR media object based on the metadata including the first information; and rendering the AR media object based on the rendering mode.

2. The method of claim 1, wherein determining the rendering mode comprises:

determining a translational rendering mode as the rendering mode in case that the first rendering area is equal to or larger than the second rendering area.

3. The method of claim 2, wherein, in the translational rendering mode, the translational motion removed from a modelling bounding box of the AR media data is expressed by as translational motion metadata.

4. The method of claim 1, wherein the information for determining the rendering mode of the AR media object further includes second information indicating whether a coded model of the AR media data includes the translational motion.

5. The method of claim 4, wherein rendering the AR media object comprises:

matching the anchor pose with a default anchor center;

identifying, based on the second information, whether the translational motion is included in the coded model of the AR media data; and rendering the AR media object by matching the default anchor center to a same location and orientation of the anchor pose in case that the translational motion is included in the coded model of the AR media data.

6. The method of claim 4, wherein rendering the AR media object comprises:

matching the pose with a default anchor center;

identifying, based on the second information, whether the translational motion is included in the coded model of the AR media data; and rendering the AR media object by matching the default anchor center to a same location and orientation of the anchor pose in case that the translational motion is not included in the coded model of the AR media data.

7. The method of claim 1, wherein determining the rendering mode comprises:

determining a non-translational rendering mode as the rendering mode in case that the first information indicates that the AR media object does not include the translational motion, and the first rendering area is equal to or larger than the second rendering area, or determining the non-translational rendering mode as the rendering mode in case that the first information indicates that the AR media object includes the translational motion, and the first rendering area is smaller than the second rendering area.

8. The method of claim 1, wherein obtaining metadata comprises receiving the metadata including the information for determining the rendering mode of the AR media object over a network by using an entry point for acquiring the metadata or delivery manifest information provided from an application server.

9. The method of claim 1, wherein the rendering mode includes a translational rendering mode and a non-translational rendering mode.

10. An augmented reality (AR) device for performing rendering for an AR media object in a communication system, the AR device comprising:

a transceiver; and at least one processor coupled to the transceiver, and configured to:

obtain metadata including information for determining a rendering mode of the AR media object, the information including first information indicating whether the AR media object includes a translational motion, receive, from a server, AR media data including the AR media object, identify an anchor pose selected for a rendering anchor of the AR media object, identify a first rendering area possible based on the anchor pose, identify a second rendering area required for the AR media object based on the metadata in case that the first information indicates that the AR media object includes the translational motion, compare the first rendering area with the second rendering area, determine the rendering mode for rendering the AR media object based on the metadata including the first information, and render the AR media object based on the rendering mode.

11. The AR device of claim 10, wherein the at least one processor is further configured to determine a translational rendering mode as the rendering mode in case that the first rendering area is equal to or larger than the second rendering area.

12. The AR device of claim 11, wherein, in the translational rendering mode, the translational motion removed from a modelling bounding box of the AR media data is expressed by as translational motion metadata.

13. The AR device of claim 10, wherein the information for determining the rendering mode of the AR media object further includes second information indicating whether a coded model of the AR media data includes the translational motion.

14. The AR device of claim 13, wherein the at least one processor is further configured to:

match the anchor pose with a default anchor center, identify, based on the second information, whether the translational motion is included in the coded model of the AR media data, and render the AR media object by matching the default anchor center to a same location and orientation of the anchor pose in case that the translational motion is included in the coded model of the AR media data.

15. The AR device of claim 13, wherein the at least one processor is further configured to:

match the anchor pose with a default anchor center, identify, based on the second information, whether the translational motion is included in the coded model of the AR media data, and render the AR media object by matching the default anchor center to a same location and orientation of the anchor pose in case that the translational motion is not included in the coded model of the AR media data.

16. The AR device of claim 10, wherein the at least one processor is further configured to:

determine a non-translational rendering mode as the rendering mode in case that the first information indicates that the AR media object does not include the translational motion, and the first rendering area is equal to or larger than the second rendering area, or determine the non-translational rendering mode as the rendering mode in case that the first information indicates that the AR media object includes the translational motion, and the first rendering area is smaller than the second rendering area.

17. The AR device of claim 10, wherein the at least one processor is further configured to receive the metadata including the information for determining the rendering mode of the AR media object through the transceiver by using an entry point for acquiring the metadata or delivery manifest information provided from an application server.

18. The AR device of claim 10, wherein the rendering mode includes a translational rendering mode and a non-translational rendering mode.

* * * * *